United States Patent Office 2,915,881
Patented Dec. 8, 1959

2,915,881
SEPARATION OF GASES

Robert L. Irvine, Pittsburgh, Pa., assignor to Koppers Company, Inc., a corporation of Delaware Application December 7, 1953, Serial No. 396,550

7 Claims. (Cl. 62—17)

This invention relates to the separation of gaseous mixtures into individual constituents or fractions thereof. It is particularly applicable to the separation of gaseous mixtures which contain thermally sensitive constituents.

This invention is particularly adapted to the recovery of separate components of a predominantly hydrocarbon gas, rich in a $C_2$ component and containing hydrogen and carbon monoxide constituents. In one of its aspects the invention is concerned with means for recovering a $C_2$ component from a gas mixture comprising hydrocarbon gases and hydrogen. In another embodiment the invention relates to a method of separating ethylene from hydrocarbons in admixture therewith.

Ethylene can be obtained from refinery gases and also by pyrolysis of hydrocarbon gases, for example in tube and regenerative furnaces. However whatever the source, ethylene must be separated from other components in admixture therewith, for example carbon monoxide, carbon dioxide hydrogen, water and hydrocarbons. Such separation of ethylene poses a number of problems.

Methods for separating ethylene from such closely associated gases and contaminants have heretofore incurred loss of substantial quantities of valuable components such as ethylene and have made their separation extremely expensive. One important advantage in operating according to this invention is that propylene recovered in the process is of refrigeration quality. Another advantage of this invention is that a process is provided for the recovery of ethylene of high purity which can be used, for example, in polyethylene production. This is a result of the high reflux ratio which can be employed in accordance with this invention in the separation of ethylene from ethane.

An object of this invention is to provide an economical means for the separation of a valuable $C_2$ component from the gases with which it is normally associated. Another object of the invention is to provide an advantageous process for separating ethylene, as well as acetylene, from other hydrocarbons and contaminants. Further objects and advantages of my invention will appear from the following description thereof taken in conjunction with the attached drawings.

In accordance with one aspect of the invention a desirable means is provided for recovering a $C_2$ component from a predominantly hydrocarbon gas mixture; in this instance liquid propylene is employed as an absorption medium. The gas mixture is passed into a first absorption zone wherein said gas is intimately contacted with liquid propylene thereby producing as absorber or rich liquid, propylene containing absorbed hydrocarbons heavier than $C_2$ hydrocarbons and a gaseous phase comprising $C_2$ hydrocarbons and lighter gases. Thereafter the gaseous phase is passed into a second absorption zone wherein it is intimately contacted with propylene in liquid phase, generally at a temperature below that in the first absorption zone, thereby producing as an effluent liquid, propylene containing predominantly $C_2$ hydrocarbons. The $C_2$ component can then be recovered from the effluent liquid as desired. Normally the effluent liquid is stripped of equilibrium content of methane and lighter constituents and then the $C_2$ component is recovered.

In another embodiment of this invention the propylene used in the first absorption zone can be a portion of the propylene employed in the second absorption zone and withdrawn therefrom as bottoms. Thus a $C_2$ component is recovered from a gas mixture of hydrocarbon gases and hydrogen by passing the gas mixture into a first absorption zone, and therein intimately contacting the gas mixture in liquid phase with effluent liquid from a second absorption zone to produce a liquid phase containing absorbed hydrocarbons heavier than $C_2$ hydrocarbons and a gaseous phase comprising $C_2$ hydrocarbons and lighter gases. Thereafter the gaseous phase is passed to a second absorption zone wherein it is intimately contacted with propylene in liquid phase, generally at a temperature below that in the first absorption zone, to produce as an effluent liquid, propylene containing predominantly $C_2$ hydrocarbons. One portion of this effluent liquid is the liquid employed as solvent in the first absorption zone, and the $C_2$ hydrocarbons are recovered from the other portion of the effluent liquid. The lighter gases, constituting the gaseous phase from the second absorption zone and comprising methane and a lighter component can then be treated for further use or employed as fuel.

In one of its other aspects, this invention involves the combination of my means for recovering a $C_2$ component from a gas mixture, with equally desirable means for recovering ethylene from the $C_2$ component. Briefly, propylene-ethylene liquid from the second absorption zone, containing predominantly $C_2$ hydrocarbons, is stripped of "equilibrium content" of methane and lighter constituents in a methane stripping zone. By "equilibrium content" is meant that concentration of a component of one phase which can be found in a different phase due to vapor-liquid behavior, e.g. concentration, pressure, temperature, solvent power, etc. The stripped effluent liquid is then fractionated to separate the $C_2$ component from the propylene absorption medium. Thereafter the $C_2$ component is, itself, fractionated to form an ethane component bottoms product and an ethylene-acetylene azeotrope overhead product. This azeotrope is resolved by absorption with a suitable acetylene solvent, e.g. acetone, leaving substantially pure ethylene in vapor phase.

It is believed that the foregoing can better be exemplified by reference to the following descriptive examples taken together with the accompanying drawings. It is understood however that the description is intended only to be illustrative of the invention and that variations within the scope of the invention will occur to one skilled in the art.

It is also believed that the invention can be best understood from the description of two modifications of the invention for the recovery of ethylene as the most important component. These modifications are shown in Figures 1 and 2 of the accompanying drawings.

Figure 1:
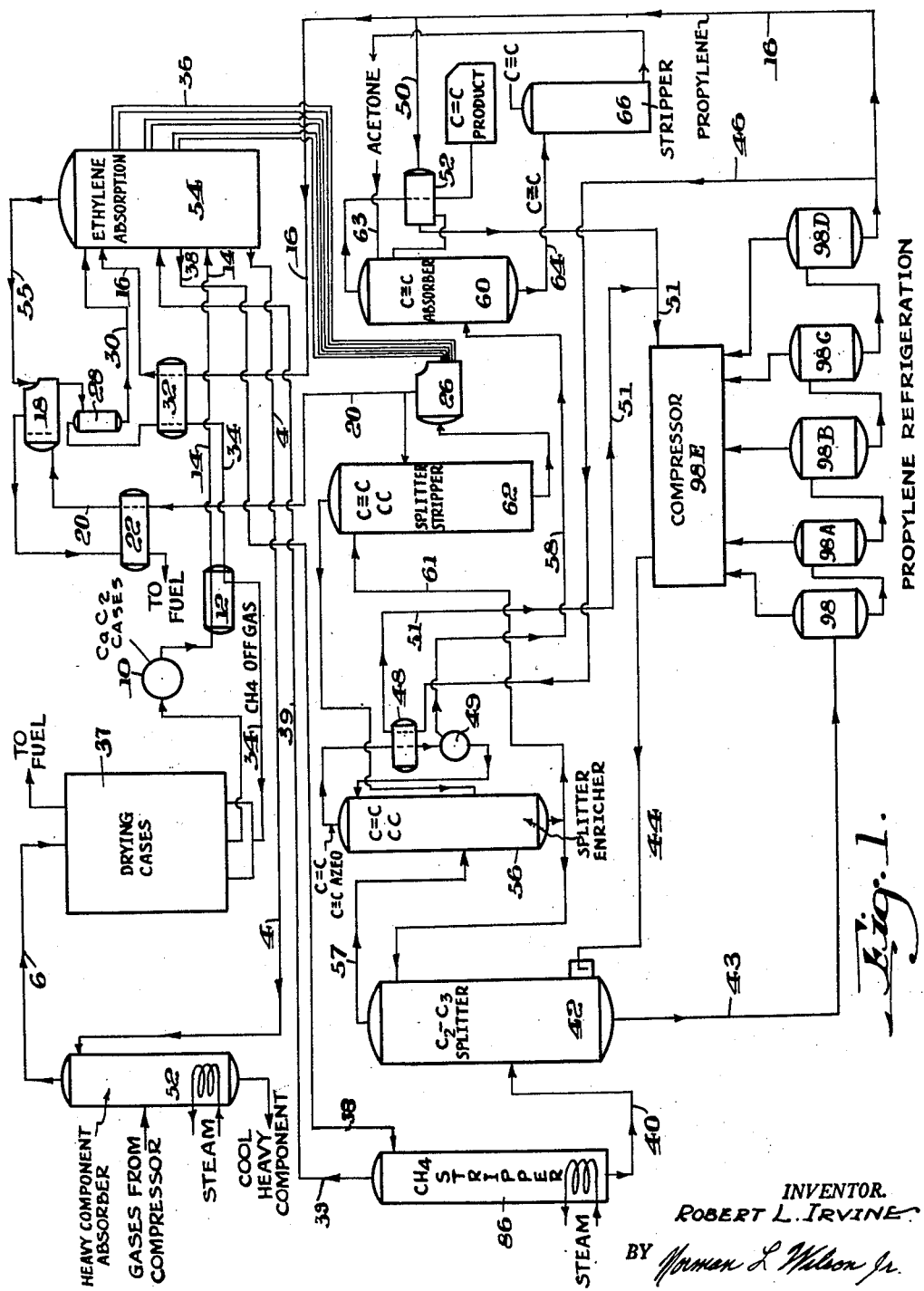
Figure 1 is a schematic diagram of one embodiment of the invention, particularly useful when the gas contains little or no carbon dioxide.

Ethylene-containing gases may be derived from a source such as a pyrolysis section, not constituting part of this invention. These gases are compressed in a compression section (not shown); and in Figure 1, the charge from the compression section enters a heavier component absorber 52 which accomplishes the removal of any hydrocarbons heavier than pentane before the gases enter a dehydration section 37. The bottoms from an ethylene absorber 54 entering absorber 52 by way of line 4 provide reflux to absorber 52. This reflux consists of $C_4$ and lighter components, and is of such quantity to absorb any components heavier than $C_4$ in absorber 52. The bottom liquid product from absorber 52 consisting of propylene and heavier product is cooled for use as desired. The overhead vapors from absorber 52 proceed to dehydration section 37 through line 6.

The complete removal of water from the gas going to the ethylene separation step is accomplished by the dehydration step. The gas from the heavier components removal section, that is column 52, is first dehydrated to approximately minus 80° F. dew point in dehydration cases 37 containing a solid absorbent, for example activated alumina. These dehydration cases alternate operation, one is used in dehydrating gas for ethylene separation, and two are used in successive steps of activation of dehydration material. The first step of this activation is the provision of a heated stream to remove moisture. The second step is the provision of the cool stream to cool the case down to suitable temperatures for dehydration. The methane and lighter product, that is, absorber off-gas from the ethylene absorber which follows, i.e. the second absorption zone, is the activation gas. This gas first passes through the dehydration case which is on the cooling cycle of activation. It is heated in an activation gas heater by indirect thermal exchange with steam and then passes through the dehydration case which is on the heating cycle of activation. The hot methane and lighter product containing the desorbed water vapor which leaves this dehydration case is normally used as fuel in the pyrolysis section. At the end of the cycle, say in four hours, valves are switched automatically for a change in sequence. The dehydration case on the cooling cycle of activation is switched to the dehydrating cycle, and the dehydration case on the heating cycle of the cycle of activation is switched to the cooling cycle of activation. Complete removal of the remaining water vapor from the effluent gas thus treated for preliminary dehydration is accomplished in calcium carbide cases 10 by chemical reaction with the calcium carbide to form acetylene which mixes with the gas stream. This is a notable dehydration means because the quantity of acetylene, one of the desired products, is increased thereby.

The dried gas stream from cases 10 is then thermally exchanged indirectly in an exchanger 12 with methane and lighter gases, passing from a methane stripper 86 through absorber 54, heating the methane and lighter stream so that it can be used in the activation of the dehydration gases as described. The chilled dry gas from exchanger 12 containing ethylene to be recovered proceeds to the absorption section 54.

The absorption step accomplishes the separation of the heavier and lighter component in producing a $C_2$ stream. The cooled, compressed and dehydrated gas enters the base of absorber 54 through a line 14; and a cold propylene stream from a propylene refrigeration system 98—98D enters absorber 54 through line 16. In ethylene absorber 54, the $C_4$'s and part of the $C_3$'s are refluxed out of the rising gas vapors. Propylene is a relatively volatile absorption medium and is recovered in an overhead recovery system using ethane cooling means. The overhead gas leaving ethylene absorption section 54 through line 55 is first cooled in an exchanger 18 to minus 100° F. by indirect heat exchange with liquid ethane product entering exchanger 18 through line 20 from an ethane reboiler 26. First, however, the liquid ethane from ethane reboiler 26 is thermally exchanged with the vaporized ethane from the exchanger 18 in an ethane economizer 22. The ethane, after being employed in cooling the overhead in exchanger 18, proceeds from economizer 22 to the pyrolysis section. The chilled absorber overhead mixture from exchanger 18 enters an absorber separator 28 with the condensed vapors returned to the top of absorber 54 through line 30. The methane and lighter product from separator 28 is heat exchanged with entering propylene absorption medium in exchanger 32 and after further heat exchange in exchanger 12 passes through line 34 to serve as activation gas in the dehydration section as described.

Another aspect of this invention involves the removal of heat of absorption from ethylene absorption column 54 with ethane as the heat removing medium. Three intercooler streams 36 are withdrawn in the lower section of ethylene absorber 54 and are chilled from approximately 40° to 20° F. in ethane reboiler exchanger 26. The intercooler streams 36 remove all of the liquid leaving the tray above and circulate this liquid to the tray below. Cold propylene absorption medium in being heated to the base temperature provides the remainder of thermal energy balances of condensation.

Returning now to the main ethylene recovery process, some of the propylene from ethylene absorber 54, containing the absorbed components, is withdrawn through line 38 and transported to the top of a methane stripper 86 where methane and lighter absorbed components are stripped out. However, part of the bottoms from absorber 54 comprising propylene and absorbed components is also introduced through line 4 to the top of heavier component absorber 52 where it removes heavy hydrocarbons and is withdrawn from the base as a propylene and heavier product. In methane stripper 86 stripped gases containing methane and lighter gases constitute the overhead product and the propylene absorption medium containing the absorbed $C_2$ component constitutes the bottom product. The latter product proceeds from the base of the stripper through line 40 to a $C_2$–$C_3$ splitter 42. In this column the $C_2$ component is separated from the propylene absorption medium. A portion of the vapors from propylene refrigeration system 98E enter $C_2$–$C_3$ splitter 42 through line 44 to serve as reboiling vapors for the splitter.

The bottom product from $C_2$–$C_3$ splitter 42, propylene at 258 pounds per square inch absolute and 110° F., leaves through line 43. This is the propylene absorption medium employed in absorbers 52 and 54. It is flashed successively in $C_3$ flash tanks 98 A, B, C and D with the vapors entering at intermediate points of a propylene compressor 98E. The $C_2$ component, passing overhead from $C_2$–$C_3$ splitter 42, proceeds to an ethylene-ethane separation section for the separation of ethane from ethylene in the $C_2$ stream by distillation.

The overhead from $C_2$–$C_3$ splitter 42 enters the base of an ethylene-ethane splitter enricher 56 through line 57. Liquid product is separated from overhead vapor product in exchanger 48, by indirect heat exchange with liquid propylene, and transported to the top of the enricher tower 56 from separator 49 to serve as reflux. The overhead vapor consisting of an ethylene-acetylene azeotrope and ethylene proceeds from separator 49 through line 58 to an acetylene absorption column 60. Part of the bottoms product of ethane-ethylene splitter 56, is used as reflux in $C_2$–$C_3$ splitter 42. The remainder is conducted through line 61 to a stripper 62 wherein ethane is separated from the ethylene. Ethane, as indicated, is used to cool the overhead stream from ethylene absorption column 54 and also serves as a refrigerant for removing heat from ethylene absorption column 54.

In column 60 the removal of acetylene from the ethylene product is accomplished. The overhead vapor product of ethylene-ethane splitter enricher 56 enters acetylene absorption column 60 through line 58, and acetylene is absorbed by intimate contact countercurrently with a stream of acetone introduced at the top of this absorption zone 60 through line 63 at 110° F. Reflux to the top of acetylene absorber 60 is provided by the indirect thermal exchange of overhead vapors with propylene refrigeration from lines 16 and 50 in condenser 52 at 243 pounds per square inch absolute pressure and minus 30° F. Ethylene thus separated from acetone absorption medium is then withdrawn as product. The bottoms from acetylene absorber 60, comprising acetylene and acetone, can then be withdrawn from absorber 60 through line 64 and acetylene can be separated from acetone in this stream as desired, for example in a stripper 66.

As seen from the foregoing description still another aspect of this invention involves the use of propylene from propylene refrigeration system 98—98E as coolant for various parts of the process. As indicated propylene from compressor 98E enters $C_2$-$C_3$ splitter 42 through line 44. In addition liquid propylene, say at minus 45° F., from 98D is transported by line 46 to enricher overhead exchanger 48 where it cools the ethylene-acetylene azeotrope leaving the top of splitter 56. From exchanger 48 vaporized propylene passes through line 51 to propylene compressor 98E. Another portion of propylene from propylene refrigeration system, 98D, is conducted through line 16 and line 50 to exchanger 52 wherein the overhead ethylene stream from the acetylene absorption column 60 is cooled so that an ethylene product free from acetone is obtained. This vaporized propylene also joins line 51 and enters compressor 98E. Another part of liquid propylene from 98D is withdrawn through line 16 and transported to ethylene absorbed 54 as absorption medium.

Figure 2:
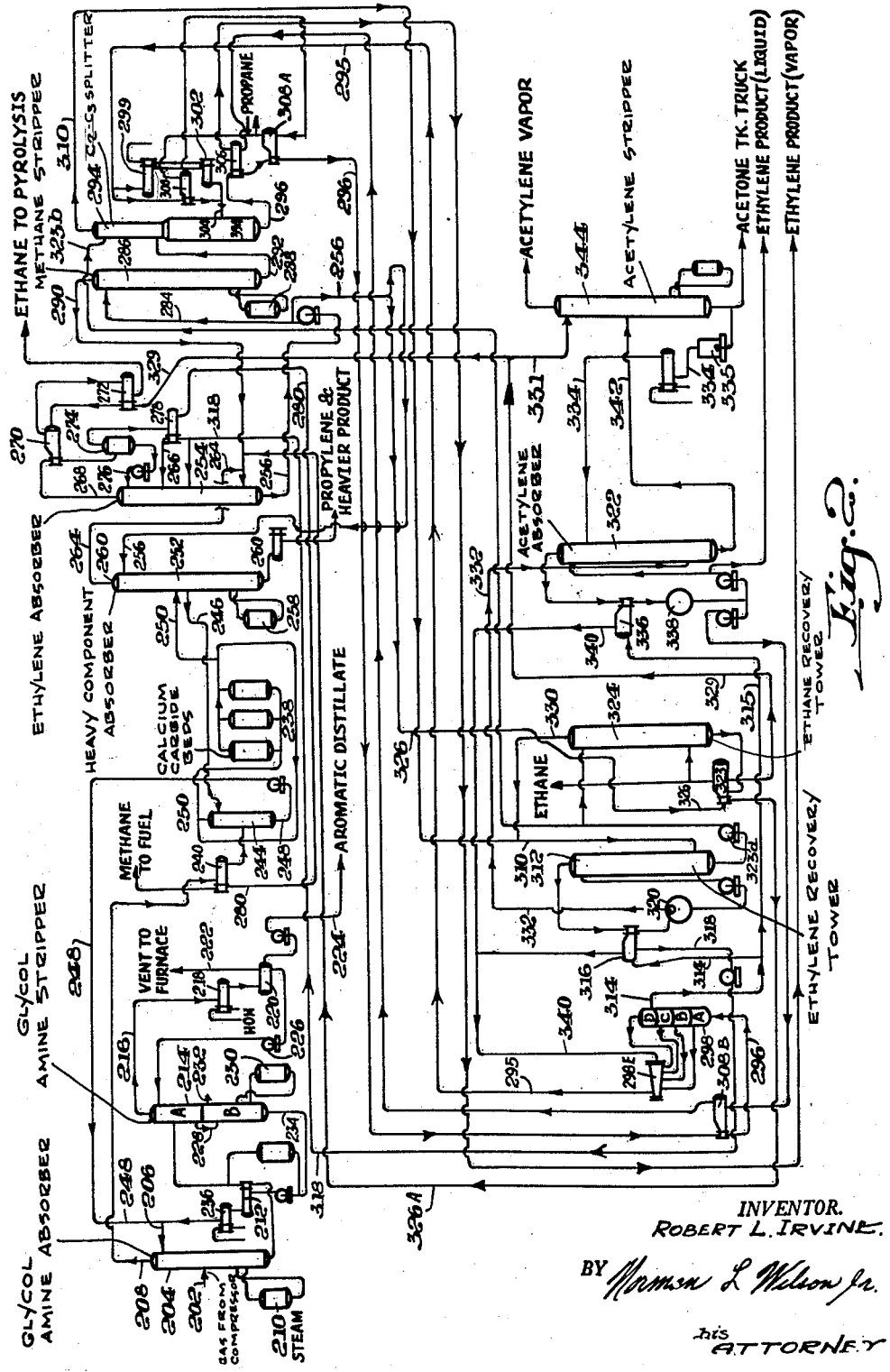
Figure 2 is a schematic diagram of another embodiment of this invention wherein means is provided for removing carbon dioxide.

Referring now to the preferred embodiment of the recovery process as shown schematically by flow diagram Fig. 2, the feed stream again is an ethylene-containing gas. As in the embodiment shown in Fig. 1, an ethylene absorber is employed wherein propylene is used as the absorption medium, the bottoms of this absorber is used as the absorption medium in a prior heavy component absorber, and propylene from the refrigeration system is employed in cooling the ethylene-acetylene azeotrope, from column 312, and in cooling the ethylene overhead from the acetone absorption zone 322. This ethylene recovery system differs from that shown in Fig. 1 by the treatment of the ethylene stream prior to the first absorption step in which the heavy components are removed. In the process of Fig. 2 the dehydration means have been modified. In this process a section is provided, prior to the absorption steps, to accomplish the removal of both carbon dioxide and the water component from the pyrolysis gas. Compressed pyrolysis gas from a compressor section enters absorber 204 through line 202, and therein contacts a solvent such as an amine, i.e. triethanol amine, etc. or advantageously, a glycol-amine mixture, such as triethylene glycol-monoethanol amine, entering at 206 that removes carbon dioxide, most of the water and aromatics by absorption. Lighter hydrocarbons are removed from the solvent tower as overhead at 208. Indirect thermal exchange with condensing 20 pound per square inch absolute steam is provided at 210 as a means of removing the lighter hydrocarbons from the absorber section. The bottoms product, a glycol-amine (or amine) solution containing absorbed carbon dioxide, water and aromatics, is thermally exchanged with hot lean glycol-amine solution in a glycol-amine exchanger 212 and then enters a glycol-amine stripper 214.

Glycol-amine stripper 214 consists of two sections: the upper tower A, the atmospheric stripper, strips out carbon dioxide and aromatics; and the lower tower B, the vacuum stripper, strips out water. Direct steam is employed as stripping medium in the upper tower A. The overhead of upper tower A proceeds by a line 216 to a glycol-amine stripper condenser 218 where indirect thermal exchange with service water condenses the aromatic components and water. The effluent from this condenser enters an aromatics-water separator 220 venting the vapor at 222, consisting mainly of carbon dioxide. In separator 220 the liquid separates into two liquid phases, water and aromatic distillate. The aromatic product is withdrawn at 224 as oil phase for use as desired. Atmospheric stripper reflux pump 226 provides condensate reflux to upper tower A to reflux back any solvent in the overhead vapors. Glycol-amine solution, now freed of its carbon dioxide and aromatic content, leaves the upper tower A of the glycol-amine stripper 214 at 300° F. and is introduced through line 228 as feed to lower tower B, which effects the final water stripping of the glycol-amine solution by the indirect thermal exchange with high pressure steam at 230. Lower tower B operates under vacuum and water vapors leave at 232 as overhead vapors. Condensate (not shown) is introduced at the top of this lower tower B to reflux back any solvent in the overhead vapors. Glycol-amine solution from water-stripping tower B is circulated at 350° F. (i.e. below its decomposition temperature) through line 234 to previously mentioned glycol-amine exchanger 212 and then passes through a glycol-amine water cooler 236 and to the top of glycol absorber 204 for reuse. Losses from the stripper are made up from a glycol-amine storage tank (not shown). Overhead gases from glycol-amine absorber 204, free of water and carbon dioxide, flow through line 208 and enter glycol-amine recovery tower 244 which recovers equilibrium content of glycol-amine solvent entrained in the overhead from glycol-amine absorber 204. This is accomplished by the introduction to the top of column 244, through 246, of a slip stream from the propylene and heavier tower to be described later. Recovered glycol-amine solution is transported from the bottom of solvent recovery tower 244 through line 248 and again introduced into the top of glycol-amine absorber 204.

Pyrolysis gases leaving solvent recovery tower 244 through line 250 enter calcium carbide cases 238 which provide for complete removal of water. Generally two of the calcium carbide cases are on the line in series while the other is held in reserve. The gas flows through the first case, is filtered in a calcium carbide filter (not shown), enters the second case, exits then through the final filter, and is cooled. Then through line 250 the gas flows to a first absorption zone 252. When the first calcium carbide case is spent the gas flow is rearranged. The second calcium carbide case is made the first calcium carbide case and the reserve case with fresh calcium carbide becomes the second case on the line. Normally a spent case is removed about once every four months and returned to the calcium carbide plant for recharging with fresh carbide.

As has been pointed out, in the practice of this invention a gas mixture is passed to a first absorption zone wherein said gas is intimately contacted in liquid phase with a liquid mixture from a second absorption zone thereby producing a gaseous phase comprising $C_2$ hydrocarbons and lighter gases. The production of a $C_2$ stream by the separation of heavier components is accomplished in the first absorption zone 252. The cooled, compressed, dehydrated gas free of any carbon dioxide or aromatics, passes from calcium carbide drying zone 238 through line 250 to enter the propylene and heavier components absorption tower 252. The liquid stream from the base of a second absorption zone, ethylene absorber 254, is introduced through line 256 to the top of this tower as reflux and absorbs any components heavier than $C_3$. Twenty plates in the stripping section serve to remove ethane and lighter components by indirect thermal exchange of condensing 20 pound per square inch absolute exhaust steam 258. Propylene and heavier components are withdrawn from the base of tower 252 at 260, cooled with cooling water to 110° F. and processed as desired.

The overhead vapors from propylene and heavier absorption tower 252 are withdrawn at 260, and through line 264 are introduced into the lower section of ethylene absorber 254 wherein the gas is intimately contacted with a countercurrent stream of cold propylene entering at 266. As described in connection with Fig. 1 the volatile propylene absorption medium is recovered in an overhead recovery system by the use of ethane cooling means. The overhead vapors leaving ethylene absorption column 254 at 268 and at a temperature of minus 70° F., containing an equilibrium amount of propylene, are chilled to minus 110° F. in a $C_2$ recovery condenser 270 by evaporation of part of the liquid ethane product from a subsequent recovery section. An ethane economizer 272 provides for thermal exchange between liquid ethane passing to condenser 270 and evaporated ethane vapor from condenser 270, superheating these ethane vapors leaving the $C_2$ recovery condenser 270 from minus 125° F. to minus 20° F. Hydrocarbons which are condensed by this chilling of ethylene absorber overhead are separated in separator 274 and returned by line 276 to the top of absorber 254. The absorber off-gas, leaving separator 274 at minus 110° F. and 500 pounds per square inch absolute pressure, constitutes the methane and lighter product gas. This light product is indirectly thermally exchanged in exchanger 278 with propylene absorption medium passing to column 254 wherein part of the cold absorption medium is cooled to minus 95° F. The methane and lighter gas is then passed through line 280 to heat exchanger 240, where it cools the gas stream from the glycol-amine absorber. After this heat exchange step the methane and lighter stream is conducted to fuel.

Referring to ethylene absorption column 254, rich propylene absorption medium, containing absorbed constituents, is transported from the base of ethylene absorber 254 through line 256 to three separate vessels as previously mentioned. Part of the propylene bottoms from ethylene absorption column 254—representing $C_3$'s entering the column over and beyond the $C_3$ loss of the absorption system—is introduced by line 256 to the top of propylene and heavier tower 252, emerging finally as a propylene and heavier product from that tower. A second portion is transported through line 326 to serve as the heating medium for the ethane recovery tower reboiler 323 of the subsequent recovery section, wherein it is cooled from 40° F. to 23° F. The liquid thus cooled is returned through line 326A to the bottom of ethylene absorption column 254. This cooling means is used in lieu of ethylene intercooling lines 36 shown in Fig. 1. Cooling in this manner reduces the quantity of propylene absorption medium required by the ethylene absorber 254. The remaining and greater part of the bottoms product from ethylene absorption column 254 proceeds through line 284 to the top of a methane stripper 286 which is provided with forty trays to strip out methane and lighter constituents from the enriched absorption oil by means of indirect thermal exchange of condensing 20 pound per square inch absolute steam at 288. Methane and lighter overhead product from methane stripper 286 is conveyed through line 290 to the base of ethylene absorption column 254. The rich absorption oil, thereby freed of its methane content, is throttled from 515 pounds per square inch absolute pressure and 120° F. in 292 and enters a $C_2$–$C_3$ splitter 294 operating at 258 pounds per square inch absolute pressure.

In this tower 294, the $C_2$ components are separated from the $C_3$ absorption medium, which in this instance is a mixture of approximately 80 percent propylene and 20 percent propane. Vapors from the propylene refrigeration system 298 serve as reboiling vapors for this $C_2$–$C_3$ splitter. Thus, compressed propylene vapor passing from propylene compressor 298E through 295 is cooled and partially condensed by indirect thermal exchange with water in propylene cooler-condenser 299. Another portion of compressed propylene from line 295 is heat-exchanged with liquid propane in vaporizer 300. The propylene stream from cooler 299 is mixed with the propylene effluent from cooler-condenser 300 and the two are discharged through line 304 into the base of the $C_2$–$C_3$ splitter with the uncondensed phase acting as reboiler vapors.

Propylene bottoms product from $C_2$–$C_3$ splitter 294 leaves the base of this tower through line 296 at 258 pounds per square inch absolute pressure and 110° F. This $C_2$–$C_3$ splitter bottoms product is first cooled in exchanger 306 with ethylene from separator 338 and the bottoms product is also heat-exchanged with liquid propane, in 308A. This propane cooling system is provided for instances where it is desired to charge gaseous propane to the pyrolysis section when the propane source is liquid propane. Liquid propane which is being charged to the pyrolysis section is vaporized in propane vaporizer 308A by thermal exchange with this liquid from the bottom of $C_2$–$C_3$ splitter 294, and propane from vaporizer 308A, and from vaporizer 300, is charged to the pyrolysis section. The provision for vaporizing propane for use in pyrolysis is particularly important in this invention since this is one means of obtaining propylene for use as absorption medium. The propylene bottoms product after leaving exchanger 308A is then continued through line 296 and flashed in successive stages A, B, C and D in propylene flash tower 298, with vapors from each flash stage entering intermediate points of the propylene compressor 298E. Numeral 298, therefore, indicates the propylene refrigeration system to be described later.

The separation of ethylene from ethane, in the $C_2$ component stream current produced by absorption in column 254 and leaving $C_2$–$C_3$ splitter 294 as overhead product through line 310, is accomplished in an ethylene-ethane separation zone. The overhead vapor from $C_2$–$C_3$ splitter 294 enters the base of an ethylene recovery tower 312. The overhead vapor from this tower is an acetylene-ethylene azeotrope.

As disclosed hereinbefore liquid propylene is employed as absorption medium in the procuration of a $C_2$ stream. In addition liquid propylene is used in cooling the acetylene-ethylene azeotrope from column 312 and the overhead ethylene product from column 322. Liquid propylene, thus cooled by expansion for example to a temperature of minus 25° F., from the last flashing zone 298D, flowing through line 314, furnishes propylene refrigeration to ethylene recovery tower-condenser 316, and also to ethylene absorber condenser 336. The evaporation of the propylene occurs in the shell side of such condenser with the propylene vapors returned to the suction of propylene compressor 298E. Liquid propylene at minus 45° F. is withdrawn from ethylene recovery tower overhead condenser 316 and is transported through line 318, exchanger 278 and through line 266 to ethylene absorber 254 to serve as absorption medium. As set forth, propylene refrigeration condenses part of the overhead from ethylene recovery tower 312 in condenser 316. This occurs at 240 pounds per square inch absolute pressure and minus 30° F.

Reflux is separated from overhead vapor product in a condensate separator 320 and is transported to the top of ethylene recovery tower 312. The overhead vapor from separator 320, consisting of the ethylene-acetylene azeotrope, proceeds through line 332 to an acetylene removal absorption column 322. The bottoms product from ethylene recovery column 312 is transported, in part, through lines 323a and 323b as reflux to $C_2$–$C_3$ splitter 294, and the remainder serves as reflux, through line 323a, to ethane recovery column 324.

Ethylene is stripped out in tower 324 by indirect thermal exchange in cooling the previously mentioned circulated stream from the base of absorber 254. (See lines 326 and 326A.) The ethylene thus stripped out in ethane recovery column 324 is passed to ethylene recovery column 312 through line 330. The ethane bottoms product from column 324 is pumped to economizer 323, and to an ethane storage tank, not shown. Part of the ethane product is withdrawn from economizer 323, in liquid phase to serve as refrigerant for the $C_3$ recovery condenser 272. (See line 329.) The remaining ethane product is withdrawn in the vapor phase for use as a charge to the pyrolysis section. If a tubular furnace is used the ethane will first be compressed.

The removal of acetylene from the ethylene product is accomplished in an acetylene absorption zone. The overhead vapor product from ethylene recovery tower 312 leaves separator 320, and through line 332 enters the base of an acetylene absorber 322 and passes up through an acetylene absorption section of twenty plates wherein it is intimately countercurrently contacted with an acetone stream 334 introduced at 110° F. to the top of the absorption zone. Above this section is an acetone recovery section of six plates, wherein any acetone vapors leaving the acetylene absorption zone are refluxed back with part of the liquid ethylene condensed in an acetylene absorber condenser 336 and separator 338. The quantity of ethylene desired as vapor product is delivered as liquid at 670 pounds per square inch absolute, and minus 30° F. to 308B where the ethylene is vaporized by thermal exchange with the bottoms of $C_2$-$C_3$ splitter. This ethylene vapor is then superheated to 90° F. in ethylene superheater 306 by indirect thermal exchange with bottoms 296 from $C_2$-$C_3$ splitter 394. In condenser 336, heat is removed with propylene refrigeration as mentioned. Proplene from 298D, passing through lines 314 and 315, condenses the ethylene reflux and product in condenser 336 at a typical ethylene pressure of, say 240 pounds per square inch absolute and minus 30° F., the propylene stream then flowing to compressor 298E through line 340. Ethylene reflux to the top of the tower provides refrigeration to maintain the bottom tray of the acetylene absorption section at minus 15° F. for a minimum of acetone circulation. A portion of this ethylene product is also used to cool the propylene bottoms product of the $C_2$-$C_3$ splitter 294. The rich acetone bottoms from acetylene absorber 322 is transported through line 342 to an acetylene stripper 344. Acetylene is stripped from the acetone by indirect condensation of 20 pounds per square inch absolute exhaust steam. Acetone, freed of acetylene, leaves as a bottoms stream, at a saturation temperature of 175° F. and 33 pounds per square inch absolute pressure and is cooled for use again as absorption medium for acetylene in acetylene absorber 322. Any trace losses of acetone are provided for by periodic addition. The acetylene vapors, stripped off in a twenty-two plate acetylene stripping section of stripper 344 below the feed plate, contain an equilibrium quantity of acetone, and six plates are provided for refluxing back this component by cooling it with part of the liquid ethane stream passing from ethane economizer 323 through lines 329 and 331. Acetylene vapors diluted with such ethane proceed to the field as vapor byproducts.

It will be noted that there are two pressure systems in the processes described. The pressure on the first system is set by a compression section which precedes the dehydration section, e.g. glycol-amine absorber 204. This first system includes, the carbon dioxide-water removal section, the ethylene absorption section, and the methane stripper. The pressure on the second system is set by the ethylene recovery tower 312. This pressure system includes the $C_2$-$C_3$ splitter, the ethylene recovery tower, the ethane removal column, the acetylene absorption zone and the acetylene stripper. It will be seen that heat of absorption is removed from the ethylene absorption column that is 254, by indirect heat exchange with ethane, the heat transferred to the ethane serving as reboiling heat for the ethane recovery tower, i.e. 324. Cooling in this manner reduces the quantity of propylene absorption medium required by the ethylene absorber. In order for this condition to obtain the pressure in the second pressure system must be lower than the pressure in the first pressure system, that is, so the temperature of ethane as recovered is low enough to provide the transfer of heat from the propylene bottoms to ethane.

In general, with the pressure relationship set forth it can be said that the pressure in each of the two pressure systems will be governed primarily by economic considerations. Thus while atmospheric pressure could be employed in the second system, with the pressure in the first system somewhat higher, it would not be economically attractive. Desirably, the pressure in the second pressure system will be in the range 100 to 300 pounds per square inch absolute while in the first pressure system it will be in the range of 350 to 600 pounds per square inch absolute. The temperature in each stage, on the other hand, will depend upon the boiling points of the constitutents under the particular conditions of pressure, etc. employed for their removal.

Generally speaking, the temperature in each absorption zone, stripping tower and fractionation column, will correspond to the phase conditions of the compounds involved, e.g. concentration, pressure, solvent power, etc. It is understood of course that the temperature in each separation zone is to be adjusted for maximum separation. Thus, in the first absorption zone, the heavy component absorption tower, the reboiler temperature can be below the boiling point of ethylene. However this would not be conducive to maximum ethylene recovery as ethylene would be withdrawn with the heavy component. Hence the reboiler temperature in the first absorption zone will be above the boiling point of ethylene under operating conditions, while in the second absorption zone the temperature will be lower than that in the first absorption zone and preferably considerably below the boiling point of ethylene under operating conditions. An example has been illustrated; others can of course be calculated by one skilled in the art. The maximum temperature is 180° F. This insures that polymerization of any unsaturates will be at a minimum.

In accordance with this invention a propylene stream either pure or impure, for example a propylene stream containing ethane, is used as the absorption medium for the removal of a $C_2$ component from a gas mixture. The advantage of using propylene as an absorption medium for the ethylene is that it reduces required boiling points in subsequent fractionation zones, such as in the methane and lighter stripper reboiler, and in the ethane-absorption medium splitter reboiler. While the disadvantage normally is its volatility, the propylene recovery system disclosed herein has overcome this disadvantage. The propylene refrigeration system set forth is possible because of this use of absorption medium. Refrigeration has been accomplished with a minimum of energy and equipment. Refrigeration exchangers for normally cooling the absorption medium are eliminated, as well as the ethane-absorption medium splitter reboiler. A workable, economical refrigeration system for ethylene plants is desirable since the separation of lighter hydrocarbons requires low temperatures. The absorption medium of propylene, besides being autorefrigerated, serves to remove the heat from the condenser in the $C_2$ fractionation step, and the ethylene product condenses in the acetylene removal step. The heavier components are absorbed in the first absorption zone, thus removing high freezing point components or readily polymerizable components of the dienes and higher acetylenic compounds, thereby ensuring the purity of the propylene absorption medium. The propylene and heavier product can be further processed if desired for butadiene and aromatic content.

A volatile solvent such as acetone is employed in the acetylene recovery system. However loss of this solvent is only in small quantity. This has been achieved by solvent absorption treatment of overhead product from both the acetylene absorber and acetylene stripper. Propylene refrigeration condenses the ethylene product and furnishes reflux to maintain the liquid phase temperature leaving the bottom of the acetylene absorber at a low temperature, thus reducing the circulation quantity of acetone for acetylene removal. This ethylene reflux introduced to the top of the solvent absorption section refluxes back any acetone rising from the acetylene absorption section. The low acetone circulation resulting from ethylene autorefrigeration in the acetylene absorbing section enables stripping out ethylene in the ethylene stripping with low pressure steam as a reboiling medium, to maintain the required temperature of ethylene stripper bottom. Acetone is freed of its acetylene content by reboiling with low pressure steam due to the solvent's low boiling point (175° F.).

Means for control of this recovery process will be obvious to one skilled in the art, and hence does not constitute a part of this invention. For example, infrared continuous analyzers can be used throughout the plant. Thus the speed of the propylene compressor is regulated by controlling the steam turbine valve and the controller for this regulation is an infrared continuous analyzer monitoring the ethane content in the ethane-ethylene splitter overhead product. Infrared analyzers can also be used for continually monitoring the methane content of the ethylene product, the propylene content of the overhead vapors of the ethane-propylene splitter, and the ethylene content of the absorber off-gas. Ethylene product purity is ensured by continuously monitoring the product for the methane and ethane content with individual infrared analyzer controllers. The methane infrared analyzer controller resets the heat addition rate to the methane and lighter stripper reboiler. The ethane infrared analyzer controller resets the reflux rate to the ethylene recovery tower. As each of these towers is provided with a plurality of plates, say forty, any desired content of either of these two components can be so maintained.

The solvent systems of the glycol-amine (or amine) in the carbon dioxide and dehydration section and that of acetone in the acetylene removal section employ normally ample circulation rates sufficient for that of the maximum anticipated design. This method of control is employed for although the quantities to be removed are small their removal is essential thereby justifying slight increases in power consumption. The arrangement of the methane-ethylene separation section also has several distinct advantages. The use of part of ethylene recovery tower 312 bottoms as reflux to the $C_2$-$C_3$ splitter 294—see lines 320A and 320B—eliminates a separate condenser with its corresponding control. The heat removal for the $C_2$-$C_3$ splitter is transferred to the ethylene recovery tower condensers. The normal limitation of the separation of ethylene-ethane mixtures with high purity ethylene product is in the enriching section of such a process as the relative volatility of these two components decreases at the higher purities of ethylene. The removal of heat from the $C_2$-$C_3$ splitter in the manner recited usefully employs the energy removal for ethylene enriching and makes possible the reduction of ethane in the ethylene product to any desired level.

This invention has been described with respect to particular steps in several examples. However modifications of these steps will obviously occur to those skilled in the art. Thus, when the pressure in the first of the two pressure systems is low enough, another propylene compression stage can be added or a cooling medium can be employed in the propylene condenser. Furthermore the methane stripper reboiler, instead of being supplied heat by steam can utilize heat from the uncondensed stream from the propylene compressor. In other words, the present invention in the broader aspects is not limited to the particular examples but embraces modifications and variations, and these can be made without departing from the spirit and scope of the invention.

I claim:

1. A process having first and second absorption zones for recovering a $C_2$ hydrocarbon component from a gas mixture of hydrocarbon components that are heavier and lighter than the $C_2$ component, which process comprises flowing said gas mixture into said first absorption zone into intimate contact with an effluent liquid propylene containing predominantly said $C_2$ component from said second absorption zone and having a temperature below the boiling point of said effluent liquid but at least as high as the boiling point of ethylene whereby said heavier components of said gas mixture are absorbed by said effluent liquid and the remaining gas mixture comprises substantially said $C_2$ and lighter components, flowing said remaining gas mixture into said second absorption zone into intimate contact with sufficient liquid propylene having a temperature below the boiling point of ethylene so that substantially all of the $C_2$ component of said remaining gas mixture is absorbed in said liquid propylene whereby an effluent liquid propylene containing predominantly said $C_2$ component is produced while said lighter components remain as gas, dividing the latter effluent liquid into first and second portions, sending said first portion to said first absorption zone for use as said first named effluent liquid, and recovering said $C_2$ component from the second portion.

2. A process for separating the components of a gaseous mixture that is predominantly constituted of $C_2$ hydrocarbon and hydrocarbons heavier and lighter than the $C_2$ hydrocarbon but also including hydrogen and carbon monoxide components, which process comprises intimately contacting said mixture with an effluent liquid propylene containing predominantly $C_2$ hydrocarbons and having a temperature lower than the boiling point of said effluent liquid but at least as high as the boiling point of ethylene whereby said effluent liquid absorbs the components of said mixture that are heavier than the $C_2$ component so that the remaining gas mixture is comprised of $C_2$ lighter components, thereafter intimately contacting said remaining gas mixture with sufficient liquid propylene having a temperature lower than the boiling point of ethylene and under a pressure greater than the pressure of said effluent liquid whereby said liquid propylene absorbs substantially all of the $C_2$ hydrocarbons to become an effluent liquid propylene containing predominantly $C_2$ hydrocarbons, dividing said last named effluent liquid into first and second portions, using said first portion as said first named effluent liquid for the first step of this process, removing the equilibrium content of methane and lighter constituents from said second portion, thereafter fractionating said second portion to separate the $C_2$ component from the propylene, fractionating the latter $C_2$ component to produce an ethane component bottom product and an ethylene-acetylene azeotrope overhead product, and intimately contacting said overhead product with an acetylene absorbing solvent to remove the acetylene so that substantially pure ethylene vapors remain.

3. A process according to claim 2 wherein an intercooler stream of effluent liquid propylene is withdrawn from the zone wherein liquid propylene absorbs substantially all of the $C_2$ hydrocarbons to become an effluent liquid propylene, passed into indirect heat exchange with said ethane component bottom product and returned to said zone, thereby removing heat from said zone.

4. A process for separating the components of a gaseous mixture that is predominantly constituted of hydrocarbons and is particularly rich in a $C_2$ component but also includes hydrogen and carbon dioxide, which comprises: absorbing substantially all of the carbon dioxide and most of the water from said mixture with an extractant liquid; further dehydrating said mixture; flowing said dehydrated mixture into intimate contact with an effluent liquid propylene containing predominantly $C_2$ hydrocarbons and having a temperature above the boiling point of ethylene in a first absorption zone whereby the hydrocarbon components that are heavier than the $C_2$ hydrocarbon component are absorbed in said liquid and the remaining gas mixture includes the $C_2$ component and lighter gases; flowing said remaining gas mixture into intimate contact with liquid propylene having a temperature below that of said effluent liquid in a second absorption zone whereby the $C_2$ components are absorbed in said liquid and the gas mixture now left contains predominantly methane and lighter components, thereafter using one portion of said liquid propylene as said effluent liquid for said heavier component absorption and stripping the equilibrium content of methane and lighter components from the second portion of said liquid, fractionating the stripped second portion to separate the $C_2$ component from the propylene of said second portion; flashing the separated propylene of said second portion in successive auto-refrigeration stages to reduce its temperature to that employed in the second absorption zone; compressing the vapors from each of said stages and using the resulting partially condensed propylene from the compression for the fractionation wherein said $C_2$ component is separated from the propylene of said second portion; fractionating said separated $C_2$ component to provide an ethane component bottoms product and an ethylene-acetylene azeotrope overhead product; cooling said overhead product by heat exchange with liquid propylene from one of said flashing stages; flowing said cooled product into intimate contact with acetone whereby acetylene is absorbed and ethylene remains as a vapor; indirectly heat exchanging said ethylene vapor with liquid propylene from the last stage of the propylene refrigeration; recovering said ethylene; withdrawing a stream of the liquid from said second absorption zone; cooling said stream by indirect heat exchange with said ethane component bottoms product thereby removing the heat from said second absorption zone; and returning this cooler stream to said second absorption zone.

5. A process according to claim 4 wherein pressure in the first and second absorption zones is higher than the pressure in the ethane and subsequent recovery zones whereby the temperature of the ethane as recovered is low enough to remove the heat of absorption from the ethylene absorption zone by indirect heat exchange.

6. A process according to claim 5 wherein an intercooler stream of saturated absorption medium is withdrawn from the second absorption zone, employed in indirectly supplying reboiling heat to a fractionation zone wherein ethane is separated as bottoms from an ethylene-acetylene azeotrope, and returned to the second absorption zone thereby removing heat from said second absorption zone.

7. Apparatus for recovering separate components of a predominantly hydrocarbon gas that is, rich in a $C_2$ component but also contains hydrogen, water and carbon monoxide, which comprises: means for intimately contacting said gas with triethylene glycol and monoethanolamine whereby carbon dioxide, water and aromatic hydrocarbons in the gas mixture are removed by absorption; means for passing the gas from the glycol-amine treatment through a bed of calcium carbide to remove any trace of water remaining in said gas; first and second absorption zones, means for passing the gas mixture thus dehydrated into said absorption zone; means for intimately contacting said gas mixture in liquid phase in said first absorption zone and at a temperature above the boiling point of ethylene, with effluent liquid from a second absorption zone, thereby producing a liquid phase containing absorbed hydrocarbons heavier than $C_2$ hydrocarbons and a gaseous phase comprising $C_2$ hydrocarbons and lighter gases; successive auto-refrigeration stages means for passing said gaseous phase from said first absorption zone into said second absorption zone; means for intimately contacting said gaseous phase in the second absorption zone in liquid phase and at a temperature below that in the first absorption zone with propylene from one of said auto-refrigeration stages thereby producing as liquid effluent, propylene containing predominantly $C_2$ hydrocarbons, and an off-gas stream containing predominantly methane and lighter hydrocarbons; means for stripping effluent liquid except that employed in the first absorption zone of equilibrium content of methane and lighter constituents in a methane stripping zone; means for fractionating the stripped effluent liquid to separate the $C_2$ component from the propylene absorption medium; means for flashing said propylene absorption medium in said successive auto-refrigeration stages to reduce its temperature to that employed in the second absorption zone, each refrigeration stage also including a compression stage and with the vapors from each refrigeration stage being passed to a compression stage; means for discharging partially condensed propylene from the compression stage directly into the fractionation zone in which the stripped effluent liquid is separated from the propylene absorption medium; means for fractionating the $C_2$ component separated from the propylene absorption medium to form an ethane component bottoms product and an ethylene-acetylene azeotrope overhead product; means for indirectly thermally heat-exchanging the evolved ethylene-acetylene azeotrope with liquid propylene from the last stage of the propylene refrigeration; means for intimately contacting the azeotrope thus cooled with acetone whereby acetylene is absorbed leaving ethylene as a vapor phase; means for indirectly heat-exchanging the ethylene vapor phase with liquid propylene from the last stage of the propylene refrigeration; means for recovering said ethylene; means for withdrawing a stream of saturated absorption medium from the second absorption zone; means for passing said stream in indirect heat exchange with ethane bottoms product separated from the azeotrope thereby removing the heat from said second absorption zone; and means for returning this cooler stream to the second absorption zone.

References Cited in the file of this patent

UNITED STATES PATENTS

| | | |
|---|---|---|
| 1,769,698 | Laird | July 1, 1930 |
| 1,865,206 | Pelzer | June 28, 1932 |
| 1,929,841 | Fitch | Oct. 10, 1933 |
| 2,064,757 | Keith | Dec. 15, 1936 |
| 2,250,925 | Babcock | July 29, 1941 |
| 2,290,957 | Hachmuth | July 28, 1942 |
| 2,301,304 | Maxwell et al. | Nov. 10, 1942 |
| 2,321,666 | Felbeck | June 15, 1943 |
| 2,428,521 | Latchum | Oct. 7, 1947 |
| 2,516,507 | Deming | July 25, 1950 |
| 2,519,343 | Berg | Aug. 22, 1950 |
| 2,616,513 | McClendon | Nov. 4, 1952 |
| 2,765,635 | Redcay | Oct. 9, 1956 |
| 2,813,920 | Cobb | Nov. 19, 1957 |

OTHER REFERENCES

Tabbert: "The Oil and Gas Journal," volume 52, September 7, 1953, pages 98–106.

Fiat Final Report 969, January 21, 1947, pages 2, 3, 18 and 21.